United States Patent [19]
Redden

[11] Patent Number: 6,047,430
[45] Date of Patent: Apr. 11, 2000

[54] BATTERY PLATE FEEDING AND HANDLING APPARATUS

[75] Inventor: Galen H. Redden, Gypsum, Kans.

[73] Assignee: Gelco International L.L.C., Shawnee Mission, Kans.

[21] Appl. No.: 09/299,414

[22] Filed: Apr. 26, 1999

Related U.S. Application Data

[62] Division of application No. 09/164,151, Sep. 30, 1998, Pat. No. 6,024,533.
[60] Provisional application No. 60/060,434, Sep. 30, 1997, and provisional application No. 60/062,747, Oct. 23, 1997.
[51] Int. Cl.[7] .................................................. A47L 25/00
[52] U.S. Cl. ........................... 15/77; 15/306.1; 15/308; 15/88.2
[58] Field of Search .............................. 198/626.3, 626.5; 15/77, 306.1, 307, 308, 88.2, 21.1; 318/39

[56] References Cited

U.S. PATENT DOCUMENTS

| | | | |
|---|---|---|---|
| 2,343,532 | 3/1944 | Buckley | 15/77 |
| 3,002,503 | 10/1961 | Bongiovanni | 15/77 |
| 3,457,574 | 7/1969 | Hirt | 15/77 |
| 4,382,308 | 5/1983 | Curcio | 15/77 |
| 5,197,837 | 3/1993 | Brown | 15/88.2 |
| 5,477,584 | 12/1995 | Thumm | 15/308 |

*Primary Examiner*—Douglas Hess
*Attorney, Agent, or Firm*—Hovey, Williams, Timmons & Collins

[57] ABSTRACT

A plate feeding and handling apparatus (10) includes an improved lug brush cleaning mechanism (18) that more effectively holds and cleans the lugs on battery plates. The lug brush cleaning mechanism includes a conveyor assembly (78) that receives and transports plates and a brush mechanism (80) for cleaning the lugs on the plates as they are transported thereby.

8 Claims, 9 Drawing Sheets

BATTERY PLATE FEEDING AND HANDLING APPARATUS

RELATED APPLICATIONS

This is a division of Ser. No. 09/164,151 filed Sept. 30, 1998 now U.S. Pat. No. 6,024,533. Applicant claims the priority benefit under 35 U.S.C. Section 119(e) of U.S. provisional application Ser. No. 60/060,434 filed Sept. 30, 1997, and of U.S. provisional application Ser. No. 60/062,747 filed Oct. 23,1997. The present application also incorporates these provisional applications by reference.

BACKGROUND OF THE INVENTION

1. Field of the Invention

The present invention relates to devices for feeding and handling stacks of plates such as lead plates used in the production of lead acid storage batteries. More particularly, the present invention relates to a battery plate feeding and handling apparatus that more effectively removes battery plates from stacks of plates, aligns or orients the plates as they are being transported, cleans the lugs on the battery plates, wraps the battery plates in insulative material, synchronizes the transport of the plates with down-stream operations, and rejects damaged or otherwise defective plates.

2. Description of the Prior Art

Lead acid storage batteries are formed from a plurality of lead plates that must be individually handled and processed during the manufacture of the batteries. Prior art devices for feeding and handling such plates suffer from several limitations that limit their utility. For example, prior art battery plate feeding and handling devices often have difficulty in removing the forwardmost plate from a stack of plates without removing more than one plate and/or damaging the plate as it is removed.

Additionally, prior art battery plate feeding and handling devices have difficulty gripping the plates and positioning lug brushes during the cleaning of the lugs of the plates, making it difficult to properly clean the battery plates. These prior art devices also have difficulty positioning or orienting the plates before they are enveloped in insulation, often resulting in mis-application of the insulation.

Prior art battery plate feeding and handling devices also have components that are difficult to adjust and/or changeover. These prior art devices also have difficulty discarding defective plates and have difficulty synchronizing the movement of the battery plates among the various stages of the battery production line.

OBJECTS AND SUMMARY OF THE INVENTION

In view of the foregoing, it is an object of the present invention to provide a battery plate feeding and handling apparatus that more effectively removes the forwardmost plate from a stack of plates without removing more than one plate and without damaging the removed plate. Additionally, it is an object of the present invention to provide such an apparatus that more effectively grips battery plates as they are being conveyed through various stages, cleans the lugs on the battery plates, aligns or orients the plates, wraps the battery plates in insulative material, synchronizes the transport of the plates with down-stream operations, and rejects damaged or otherwise defective plates.

The present invention achieves these and other objects by providing an improved plate feeding and handling apparatus that includes an improved plate feeder station having a plurality of stops that are contacted by the forwardmost plates of stacks of plates as the stacks are advanced towards a pick-up assembly. The stops each include a vacuum port that holds the forwardmost plate of the stack against the stop while permitting the remaining plates in the stack to move slightly away from the stop, thus creating a gap between the forwardmost plate and the remaining plates in the stack for facilitating pick-up of the forwardmost plate.

The battery plate feeding and handling apparatus of the present invention also includes an improved lug brush cleaning station that more effectively grips the plates as they are being cleaned and that more effectively and consistently positions a pair of lug brushes during cleaning and servicing. The station includes structure that permits an operator to select the amount of gripping force applied to the plates as they pass therethrough. The station also includes a servo assembly that more precisely positions the rotating brushes during cleaning of the lugs on the plates.

The apparatus of the present invention also includes a plate alignment station that allows an operator to more easily adjust the position of the plates as they enter a plate enveloper. Specifically, the plate alignment station includes a pair of side-by-side conveyor chains for carrying the plates to the plate enveloper and a servo assembly coupled with each chain for advancing or retarding the chains relative to one another for adjusting the orientation of the plates on the chains.

The apparatus of the present invention also includes a plate rejection station that more rapidly and accurately rejects plates that have been determined to be damaged or otherwise unsuitable for use in batteries. Specifically, the plate rejection station includes a pair of aligned conveyors, a cylinder assembly for lowering one end of one of the conveyors, and a cylinder assembly for raising one end of the other conveyor. The cylinder assemblies are cross-coupled so that as the first conveyor is lowered, the second conveyor is raised, thus creating a gap between the two conveyors to permit defective plates to be discarded from the conveyors.

The apparatus of the present invention also includes a plate synchronization station that allows the normal rapid transport of the battery plates to be temporarily suspended so that time-consuming processes occurring downstream can be completed. Then, when the plates are ready to be once again transported downstream, the plate delay synchronization assembly accurately places the plates in proper order so that the transport of the plates is synchronized with the remaining components of the plate feeding and handling apparatus.

BRIEF DESCRIPTION OF THE DRAWING FIGURES

A preferred embodiment of the present invention is described in detail below with reference to the attached drawing figures, wherein.

DETAILED DESCRIPTION OF THE PREFERRED EMBODIMENTS

Figures 1, 21, 25:
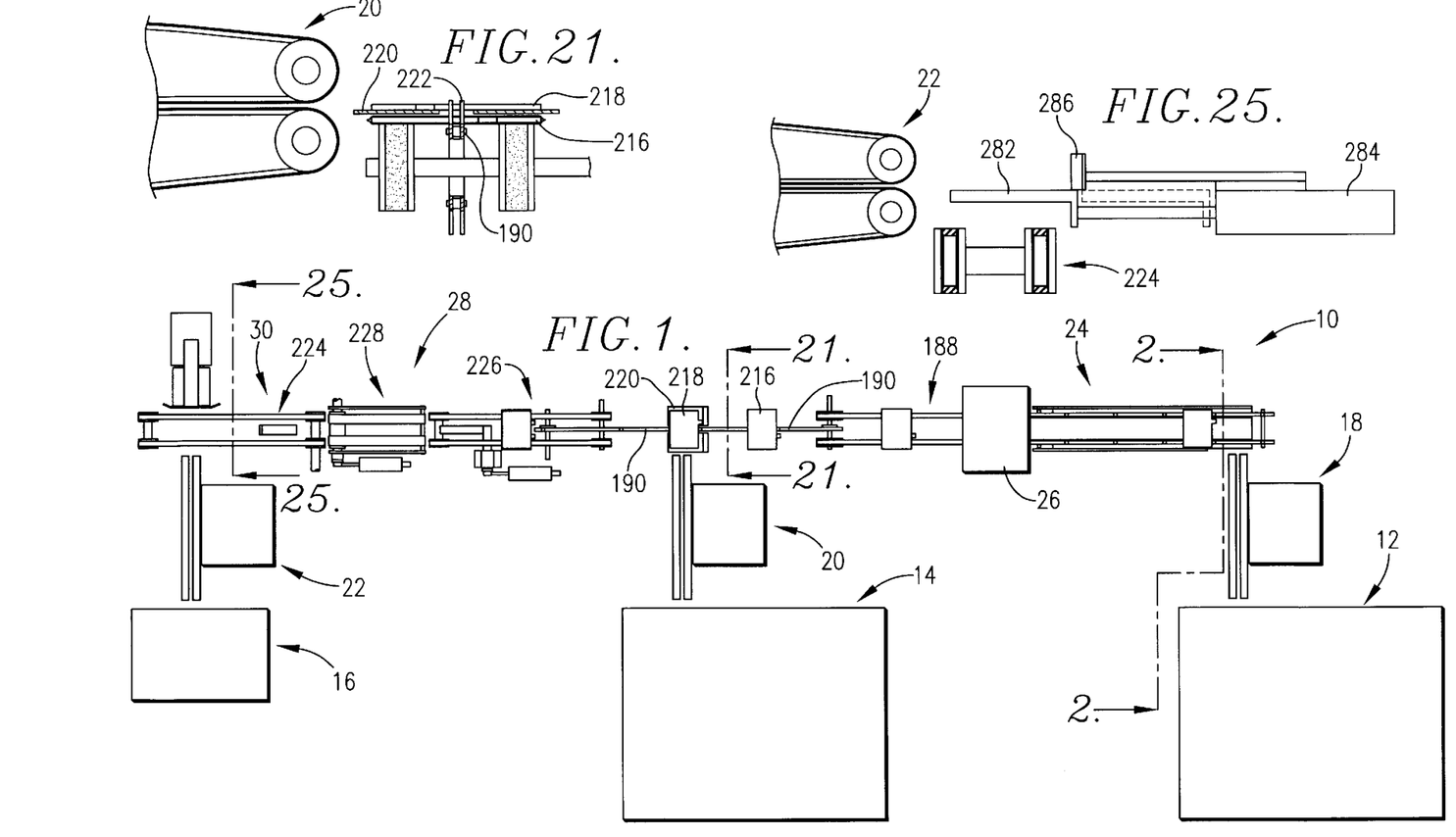
FIG. 1 is a schematic layout in plan view of a battery plate feeding and handling apparatus constructed in accordance with a preferred embodiment of the present invention.
FIG. 21 is a sectional view taken along line 21—21 of FIG. 1 and showing the transport of a non-wrapped plate onto a conveyor.
FIG. 25 is a sectional view of one component of the plate synchronization station taken along line 25—25 of FIG. 1.

Turning now to the drawing figures, and particularly FIG. 1, the plate feeding and handling apparatus 10 of the present invention broadly includes a pair of automatic plate feeder and pick-up stations generally referred to by the numerals 12,14, a manual plate feeder station 16, three lug brush cleaning stations 18,20,22, a plate alignment station 24, a plate encapsulating station 26, a plate rejection station 28, and a plate synchronization assembly 30. Each of these stations is discussed separately below.

PLATE FEEDER AND PICK-UP STATIONS

The automatic plate feeder and pick-up stations 12,14 are described in detail in application Ser. No. 08/812,372, U.S. Pat. No. 5, 834,866, entitled PLATE FEEDER APPARATUS, filed Mar. 5, 1997, hereby incorporated into the present application by reference. The station 12 handles battery plates that are to be wrapped in insulative material in the encapsulation station 26, whereas the station 14 handles plates that are not wrapped. The manual plate feeder station 16 is used for manually feeding battery plates into the production line for use in forming certain types of batteries that require an odd number of plates.

The automatic plate feeder and pick-up stations 12,14 are substantially identical; therefore only the station 12 is described and illustrated in detail herein. As best illustrated in FIGS. 2–8, the station 12 includes a plate feeder 32 that holds and sequentially feeds two stacks 34 of plates, and a pick-up 36 that successively picks or removes the forwardmost plate 38 from each stack and then drops the removed plates onto a conveyor 40. The conveyor then carries the plates to the lug brush cleaning station 18 as described below. The plate feeder and pick-up are driven by a drive shaft coupled with a conventional AC motor, which may in turn be coupled with a variable frequency drive and a PLC or other type of controller for automating the operation of the station.

As best illustrated in FIGS. 4 and 6–8, the plate feeder 32 has an inlet side 42 and an outlet side 44 and includes a pair of side-by-side conveyor assemblies 46,48. Each of the conveyor assemblies includes a pair of conveyor chains 50,52,54,56 trained over a set of drive and idler sprockets 58,60 and a plate pusher assembly 62 supported on top of the chains for holding and advancing the stacks 34 of plates towards the pickup 36.

The outlet side 44 of each conveyor assembly 46,48 also includes a pair of stops 64,66,68,70 that serve as benchmarks to stop the forward movement of the plates on the conveyor chains 50,52,54,56. In accordance with one aspect of the present invention, each of the stops includes a vacuum port 72 that is coupled with a source of vacuum pressure.

Figure 4:
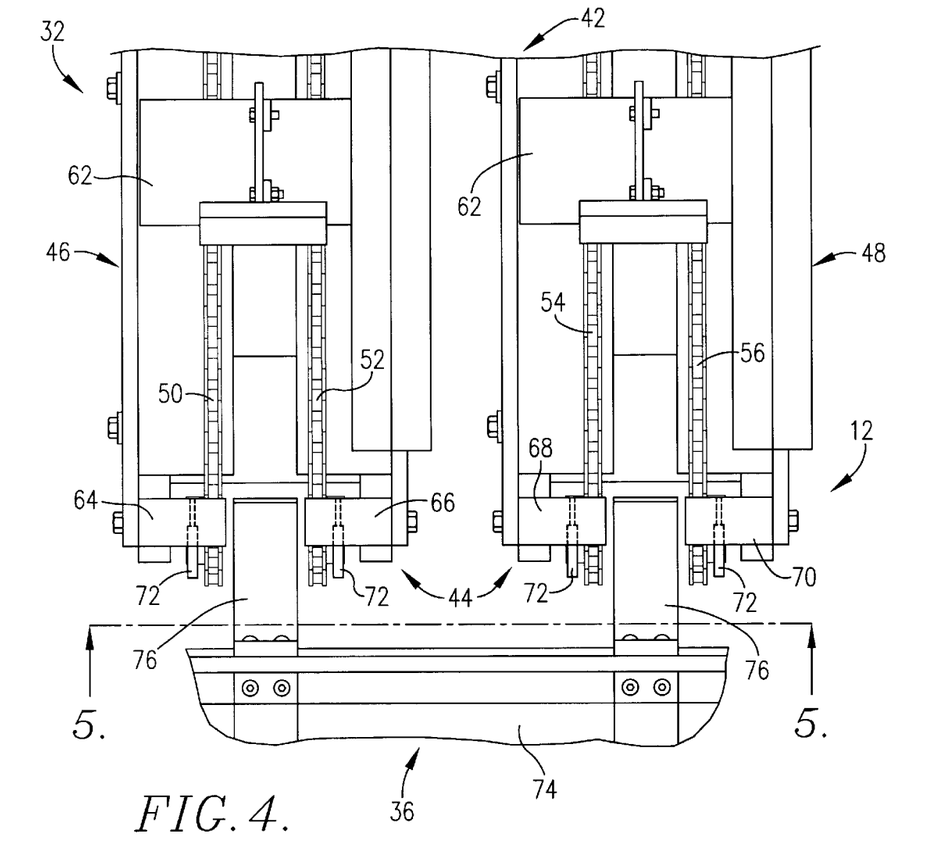
FIG. 4 is a fragmentary plan view of the plate feeder and pick-up station shown in FIG. 2.
Figure 5:
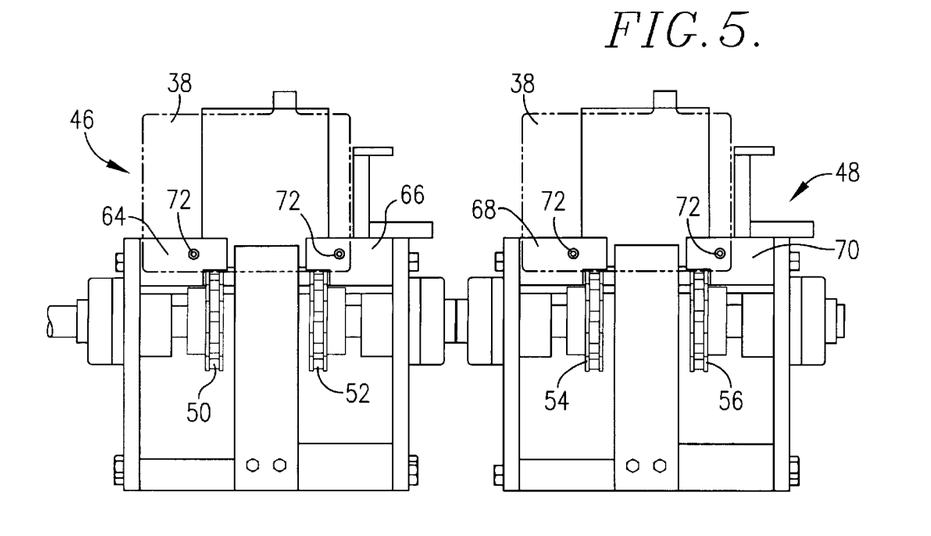
FIG. 5 is a sectional view of the plate feeder and pick-up station taken along line 5—5 of FIG. 4.

The pick-up 36 includes a rotatable head 74 having at least two outwardly extending pick-up snouts 76 extending therefrom. As best illustrated in FIG. 4, the pick-up snouts are rotated between the chains 50,52,54,56 so that they contact the front surface of the forwardmost plates in the stacks 34 as described in more detail below. The pick-up snouts are coupled with a suitable source of vacuum pressure which is controlled by valve structure described more fully in U.S. Pat. No. 5,934,866.

In operation, stacks 34 of plates are placed on the pusher assemblies 62, which are then placed on top of the conveyor chains 50,52,54,56. The plate feeder 32 is then operated to advance the pusher assemblies and stacks of plates towards the pick-up 36. To facilitate removal of only the forwardmost plate from each stack, the plate feeder shifts the stacks forward a first distance toward the pick-up and then shifts the stacks a second, shorter distance away from the pick-up during rotation of the pick-up as described in more detail below.

While the plate feeder 32 advances the stacks 34 of plates, the pick-up 36 rotates its snouts 76 in front of the forwardmost plates 38 in the stacks. The snouts are valved so that they are connected to vacuum pressure as they rotate in front of the plates and than disconnected from the vacuum pressure as they pass over the conveyor 40. This permits each snout to remove the forwardmost plate from its associated stack as it passes thereby, to hold the removed plate as the vacuum head continues to rotate, and then to release the plate over the conveyor.

Figure 6:
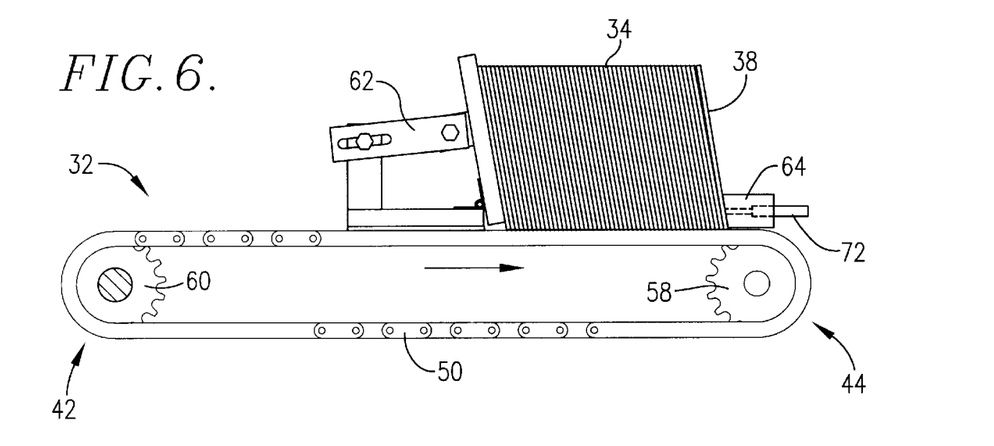
FIG. 6 is a schematic depiction of the plate feeder illustrating the transport of a stack of plates against a stop.
Figure 7:
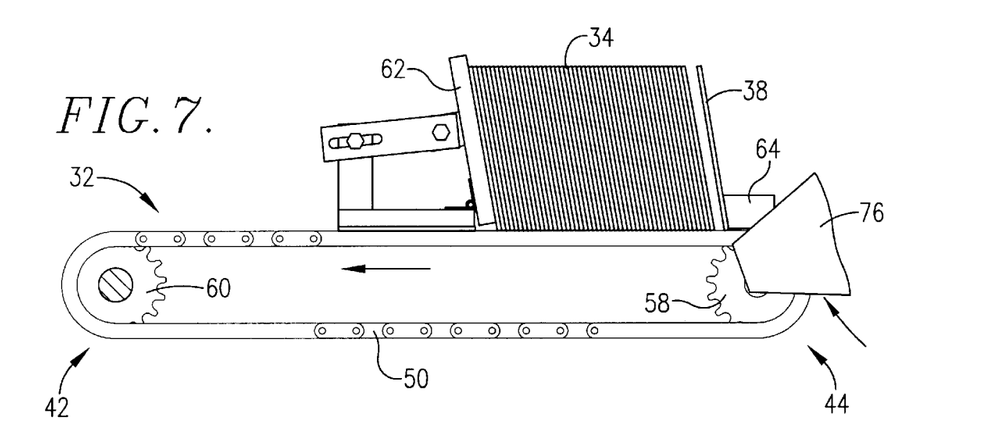
FIG. 7 is a schematic depiction of the plate feeder illustrating the transport of the stack of plates and showing the gripping of the forwardmost plate in the stack by the stop.
Figure 8:
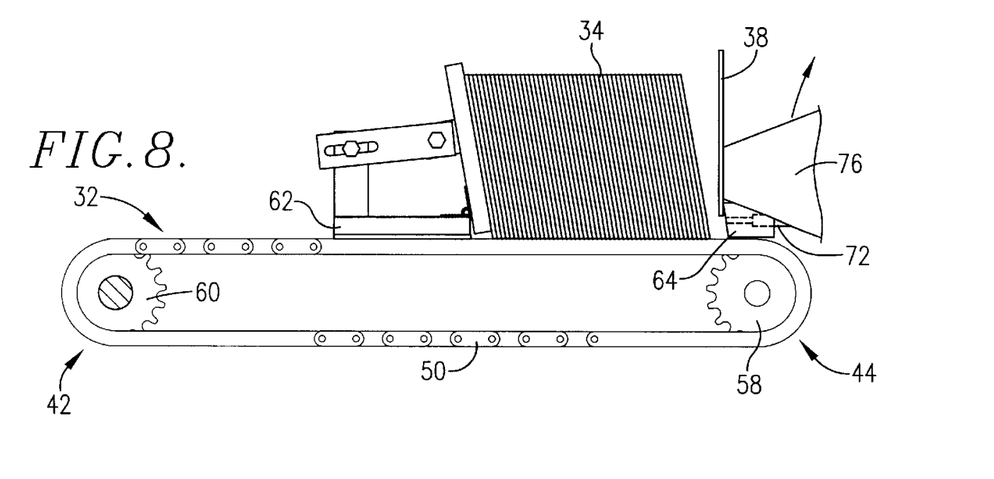
FIG. 8 is a schematic depiction of the plate feeder illustrating the transport of a stack of plates and showing the removal of the forwardmost plate of the stack by the pick-up assembly.

As best illustrated in FIGS. 6–8, the operation of the plate feeder 32 and pick-up 36 are synchronized to ensure that the snouts 76 consistently pick or remove only the forwardmost plates 38 from the stacks 34 without damaging the removed plates as the snouts rotate by the stacks. The plate feeder initially advances the plates forward against the stops 64,66, 68,70 before the pick-up snouts rotate by the stacks as illustrated in FIG. 6. The plate feeder then moves the stacks rearward as illustrated in FIG. 7 immediately before the snouts rotate by the stacks. This creates a gap between the forwardmost plates and the remaining plates in the stacks to ensure that the snouts remove only the forwardmost plates from the stacks. This also permits the snouts to continue to rotate by the stacks without striking the tail ends of the removed plates against the remaining plates in the stacks as illustrated in FIG. 8.

To further facilitate the removal of the forwardmost plates 38 from the stacks 34 without removing more than one plate from each stack, the vacuum ports 72 in the stops 64,66,68, 70 are operated to capture-and hold the forwardmost plates on the stops while permitting the plates behind the forwardmost plates to move slightly rearward, thus creating a gap between the forwardmost plates and the remaining plates in the stacks as illustrated in FIG. 7. This allows the snouts 76 of the pick-up 36 to gently contact the forwardmost plates as they are rotated thereby so that the snouts more consistently pick-up the forwardmost plates without picking up more than one plate each. This construction also allows the pick-up snouts to be operated at a lower vacuum pressure because less vacuum force is needed to pickup the forwardmost plates. The operation of the vacuum ports is preferably automatically sequenced with the rotation of the snouts with valve structure or under the control of a PLC or other controller.

After the snouts 76 have passed by the stacks 34, the plate feeder 32 once again shifts the stacks to their forwardmost positions and then back to their rearward most positions before the next snouts arrive. This positions and captures the next forwardmost plates against the stops 64,66,68,70. As mentioned above, the pusher assemblies 62 are moved forward toward the pick-up 36 a greater distance than they are moved away from the pick-up to account for the thickness of the removed plates. This ensures that the stacks are always positioned a pre-determined distance from the pick-up snouts regardless of how many plates have been removed.

The manual plate feeder station 16 illustrated in FIG. 1 is entirely conventional and includes a conveyor mechanism (not shown) on which battery plates may be manually placed for transport to the lug brush cleaning mechanism 22. The manual plate feeder station is typically used only when batteries requiring an odd number of plates are to be manufactured.

LUG BRUSH CLEANING STATIONS

A lug brush cleaning station 18,20,22 is provided for each of the two automatic plate feeder and pick-up stations 12,14 and the manual plate feeder station 16. The three lug brush cleaning stations are substantially identical; therefore only the station 18 is illustrated and described in detail herein.

Figures 2, 3:
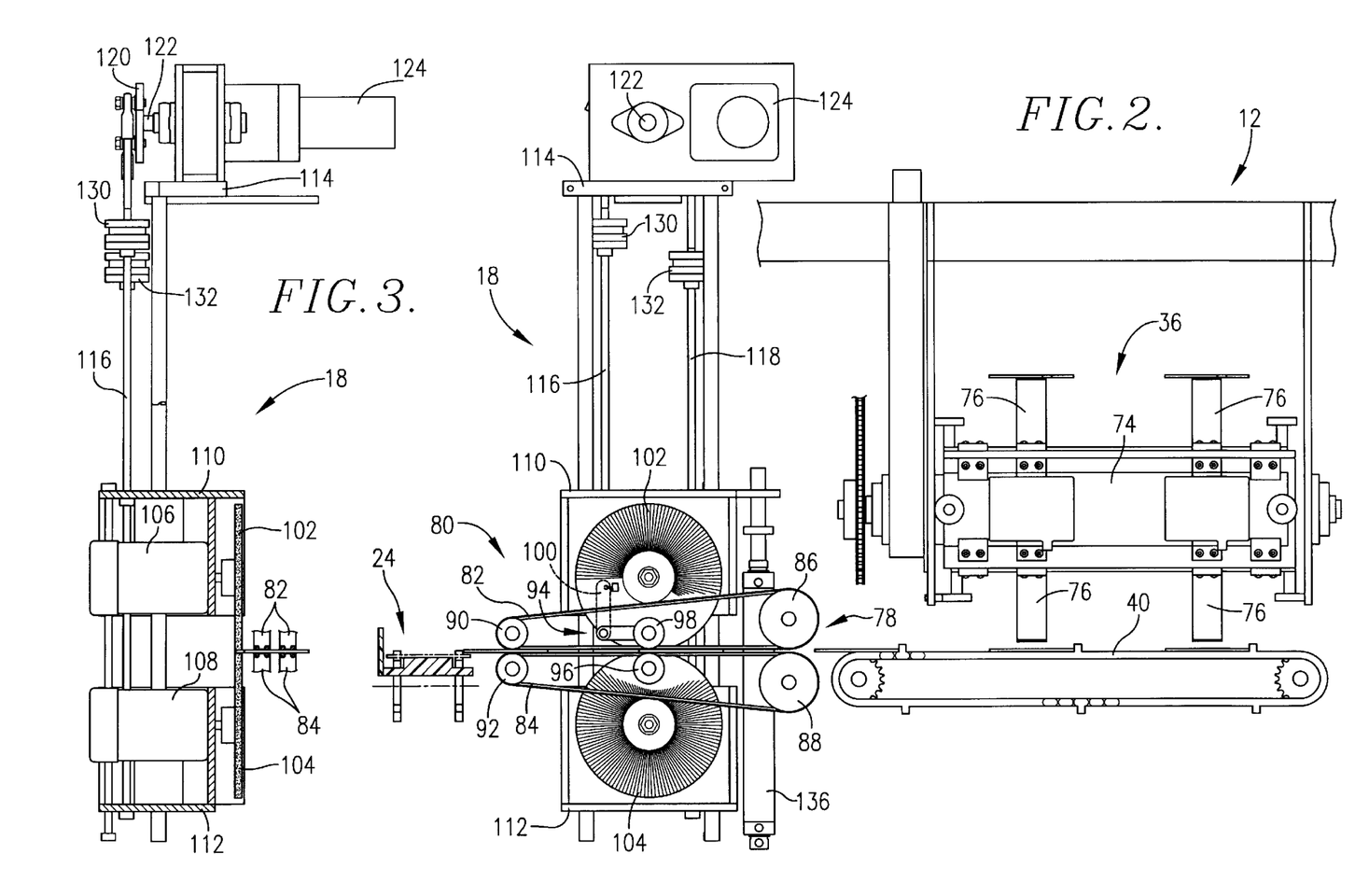
FIG. 2 is an elevational view of one of the plate feeder and pick-up stations and lug brush cleaning stations of the apparatus taken along line 2—2 of FIG. 1.
FIG. 3 is a side view of the lug brush cleaning station of FIG. 2.

As best illustrated in FIGS. 2 and 3, the lug brush cleaning station 18 includes a conveyor assembly 78 that receives and transports plates from the conveyor 40 and a brush mechanism 80 for cleaning the lugs on the plates as they are transported thereby on the conveyor assembly 78.

The conveyor assembly 78 preferably includes a pair of vertically stacked upper and lower conveyor belts 82,84 that are each trained around a drive roller 86,88 and an idler roller 90,92, and a biasing mechanism 94 for biasing the conveyor belts into contact with one another. The drive rollers are vertically spaced a small distance apart to define a nip region therebetween for gripping the plates as they exit the conveyor 40 and introducing the plates between the two conveyor belts 82,84.

The biasing mechanism 94 includes a fixed roller 96 positioned below the upper portion of the lower conveyor 84 and a spring-biased roller 98 positioned above the lower portion of the upper conveyor 82. The spring-biased roller is coupled with a spring and lever mechanism 100 that exerts a downward force on the spring-biased roller so that the roller exerts a downward force on the upper conveyor 82. This biases the conveyors into contact with one another to prevent the battery plates between the conveyors from moving relative to the conveyor belts as their lugs are being cleaned by the brush station. This also allows both of the conveyors to be driven by a single drive line if desired. The downward force exerted on the spring-biased roller by the lever mechanism can be selectively adjusted by an operator to provide the optimum amount of pressure between the two conveyors.

The brush mechanism 80 includes a pair of vertically stacked upper and lower rotatable brushes 102,104 each driven by a separate motor 106,108. The brushes are preferably formed of steel and are approximately 10" in diameter and ½" thick. The brushes and their corresponding motors are supported on frames 110,112 that are suspended below an upper support 114 by a pair of tie rods 116,118. As best illustrated in FIGS. 9–12, the upper ends of the tie rods are attached to a servo arm 120 that is coupled with the output shaft 122 of a servo motor and gear box 124 that is mounted on the support 114.

Figures 9, 10, 11:
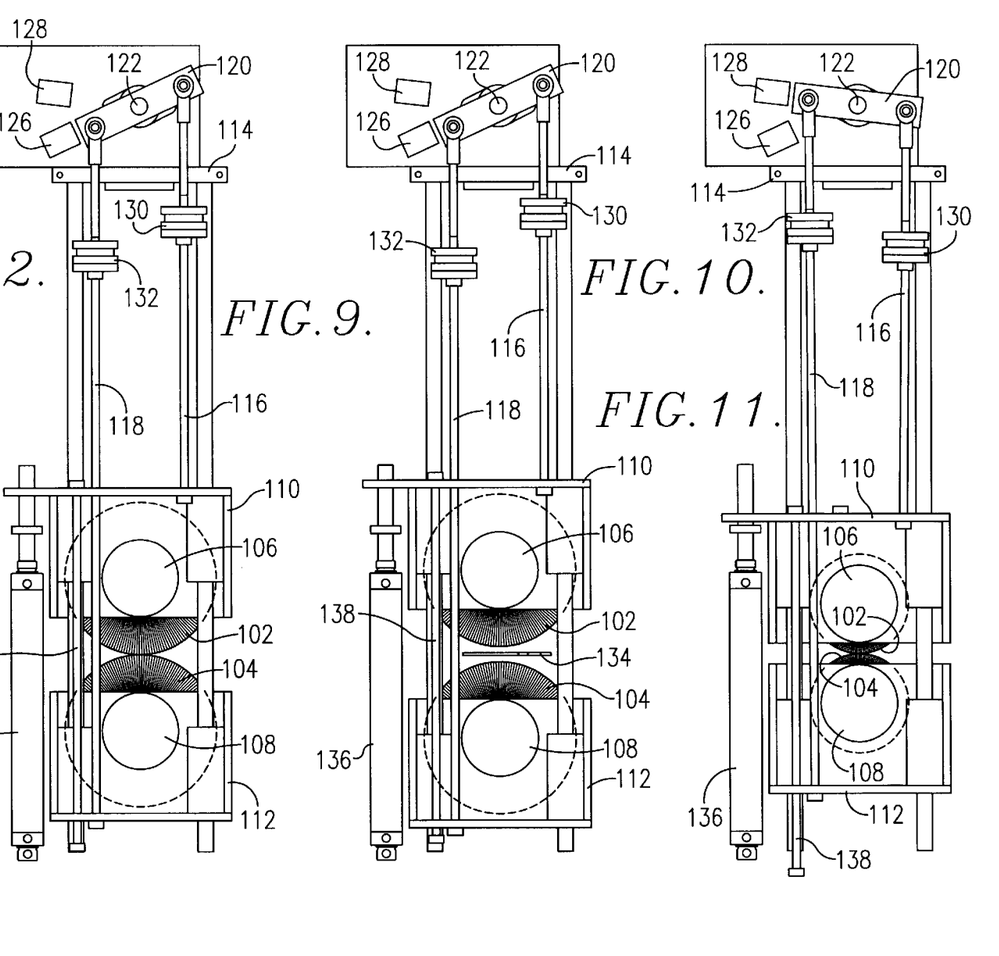
FIG. 9 is an elevational view of the lug brush cleaning station showing the lug brushes in their operating, cleaning position.
FIG. 10 is an elevational view of the lug brush cleaning station showing the brushes in their idle position.
FIG. 11 is an elevational view of the lug brush cleaning station showing the brushes in their operating position but after they have become worn and are ready to be replaced.

As illustrated in FIGS. 9 and 11, the servo motor 124 can be operated to reposition the upper and lower brushes 102,104 as they become worn. Initially, when the brushes are new, the servo motor 124 positions the brushes as illustrated in FIG. 9. Then, as the brushes become worn and decrease in diameter, the servo motor gradually rotates the servo arm clockwise as illustrated in FIG. 11 to lower the upper brush 102 and raise the lower brush 104 to move the centers of the brushes closer together to maintain the contact between the outer edges of the brushes.

As the servo arm 120 is rotated clockwise, the tie rod 118 raises the lower brush 104 and the tie rod 116 lowers the upper brush 102 the exact same distance. Similarly, when the servo arm is rotated counterclockwise, the tie rod 118 lowers the lower brush 104 and the tie rod 116 raises the upper brush 102 the exact same distance. Thus, as the servo motor shaft 122 is rotated, the servo arm 120 and tie rods simultaneously lift or lower the brushes the same distance in the reverse direction so that the brushes are always the same distance away from the plates carried between the conveyors 82,84.

To sense and monitor the positioning of the upper and lower brushes 102,104, a pair of position sensing switches or contacts 126,128 may be mounted to the support 114. The switches may be coupled with a controller or with indicators to alert an operator when the brushes become completely worn and need to be replaced.

In preferred forms, each of the tie rods 116,118 has two segments that are joined by a pancake cylinder 130,132. As illustrated in FIG. 10, the pancake cylinder 130 can be operated to raise the upper brush 102 a slight distance and the pancake cylinder 132 can be operated to lower the lower brush 104 a slight difference to create a small gap between the two brushes. The pancake cylinders are typically operated whenever the apparatus 10 is temporarily shut down and the conveyors 82,84 have been stopped. This separates the brushes from a battery plate 134 that has stopped therebetween to prevent the brushes from eroding the lug off of the battery plate.

Figure 12:
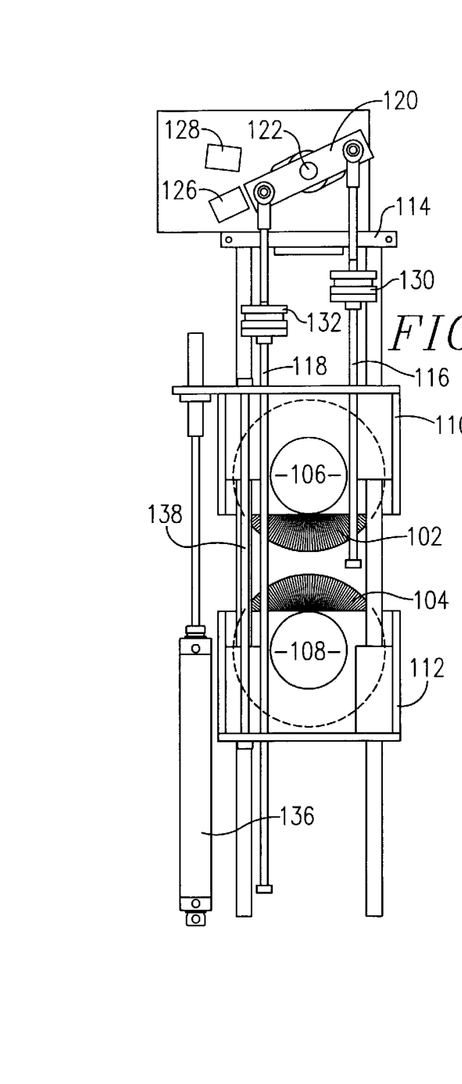
FIG. 12 is an elevational view of the lug brush cleaning station showing the brushes in their service position.

The brush mechanism 80 also preferably includes a cylinder 136 that can be operated to lift the brushes 102,104 into a raised, service position as illustrated in FIG. 12. The cylinder is attached to the frame 110 of the upper brush 102, which is in turn connected to the frame 112 of the lower brush 104 by a tie rod 138. As best illustrated in FIG. 9, the tie rod is slightly longer than the spacing between the two frames when the brushes are in their operating positioning. The cylinder will therefore first raise the upper brush a short distance before the tie rod begins to raise the lower brush, thus slightly separating the brushes when they are in their service position illustrated in FIG. 12.

PLATE ALIGNMENT STATION

The plate alignment station 24, which is best illustrated in FIGS. 13–17, receives the plates after they have been cleaned by the lug brush cleaning mechanism 18 and advances the plates to the plate encapsulation station 26. The plate alignment station allows an operator to easily adjust the orientation or alignment of the plates before they enter the encapsulation station to ensure that the insulation is properly applied to the plates.

Figure 13:
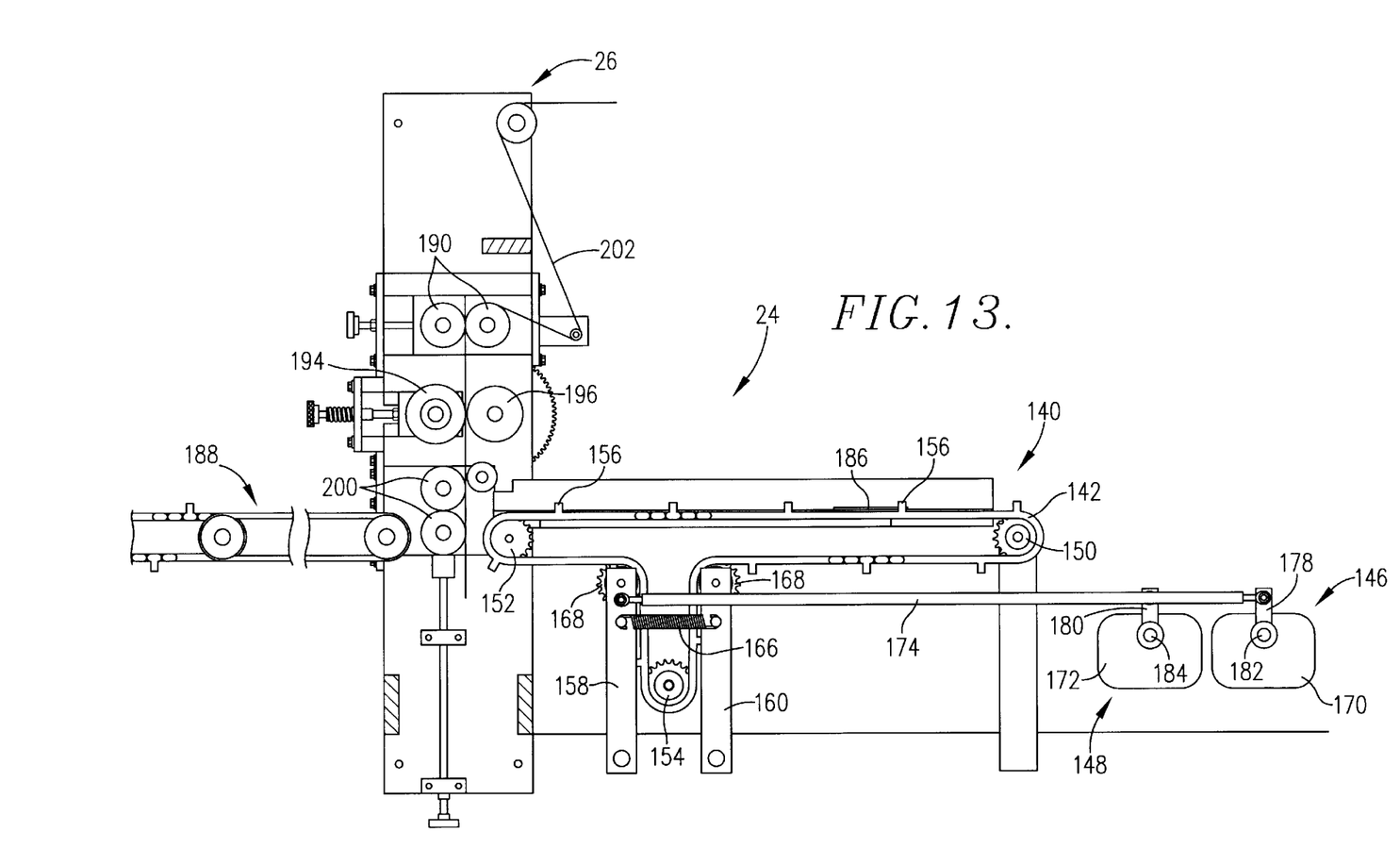
FIG. 13 is an elevational view of the plate alignment station and plate encapsulation station of the apparatus.
Figure 14:
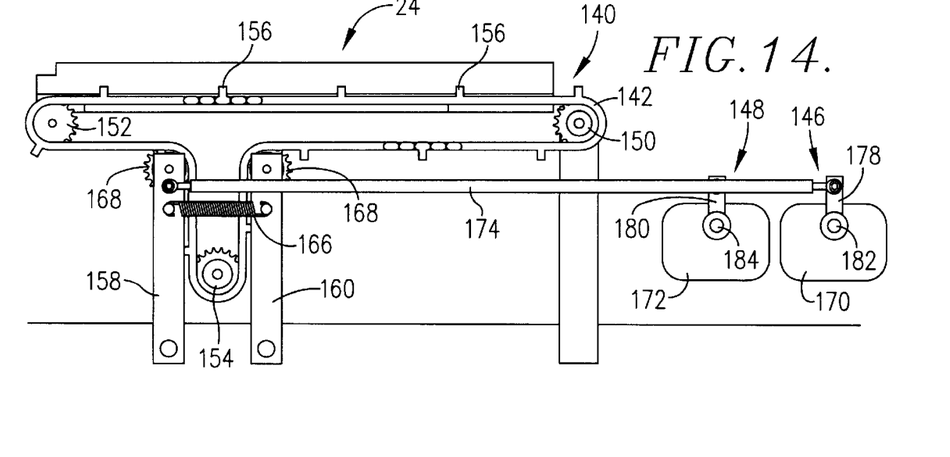
FIG. 14 is an elevational view of the plate alignment station.
Figure 15:
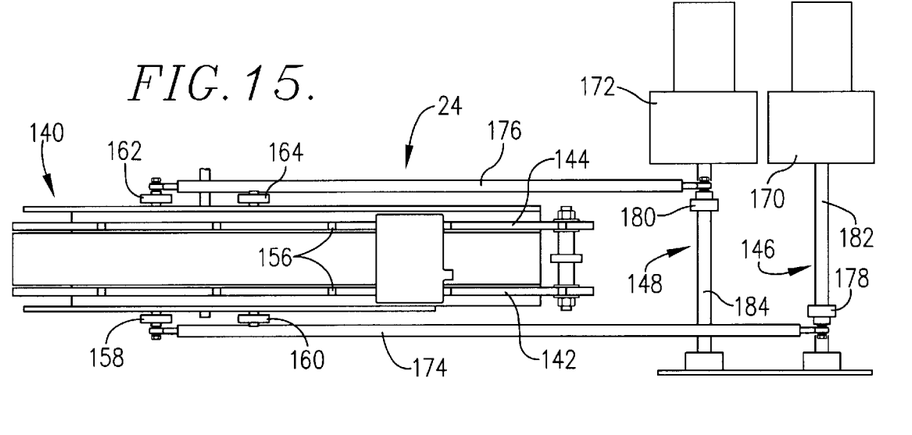
FIG. 15 is a plan view of the plate alignment station.

The plate alignment station 24 includes a conveyor 140 having a pair of 30 side-by-side chains or belts 142,144 and a pair of servo assemblies 146,148 each coupled with one of the chains. As best illustrated in FIGS. 13 and 14, the chains are each trained over a pair of idler sprockets 150,152 and a drive sprocket 154 and include a plurality of spaced projections 156 along the length thereof for contacting and advancing the battery plates toward the encapsulation station.

Each servo assembly 146,148 includes a pair of generally vertically extending levers 158,160,162,164 that are pivoted about their lower ends. Each pair of levers are coupled together with a spring or tie rod 166 (only one shown) and each includes an idler sprocket 168 on its upper end that contacts the outer surface of its corresponding conveyor chain. Each servo assembly also includes a servo or stepper motor 170,172 and a tie rod 174,176 that is connected between the upper end of the levers 158,162 and a pair of servo arms 178,180. The servo arms are attached to the rotatable shafts 182,184 of the corresponding stepper motors.

Figure 16:
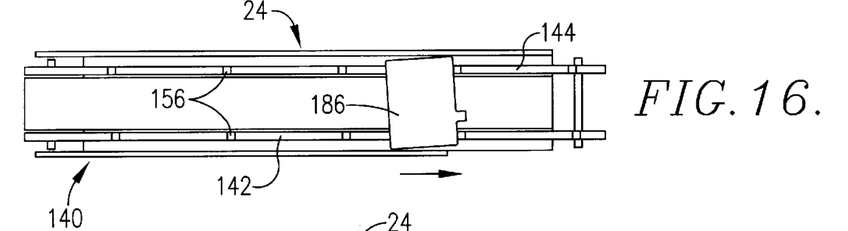
FIG. 16 is a schematic depiction of the plate alignment station illustrating the positioning of a battery plate thereon.
Figure 17:
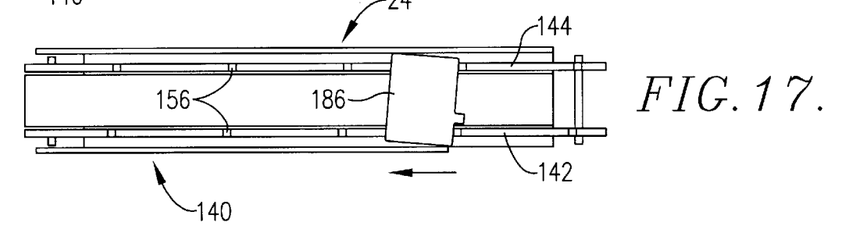
FIG. 17 is a schematic depiction of the plate alignment station illustrating the positioning of a battery plate thereon.
Figures 18, 19:
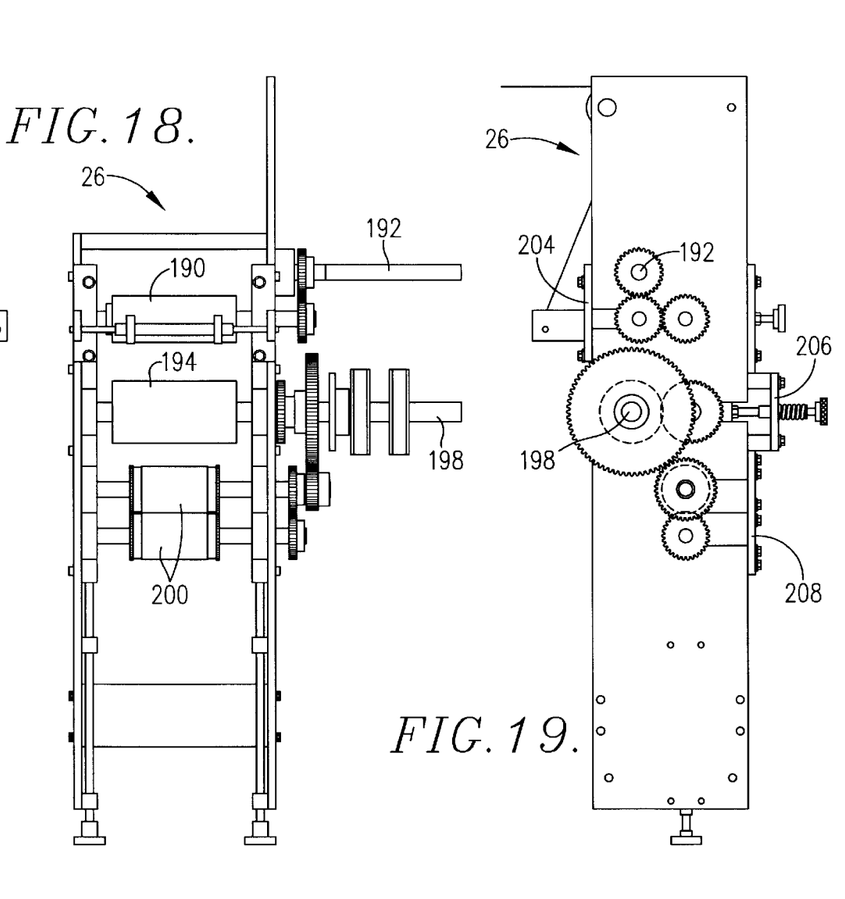
FIG. 18 is a front view of the plate encapsulation station of the apparatus.
FIG. 19 is a side view of the drive side of the plate encapsulation station.

The servo assemblies 146,148 can be operated to advance or retard one of the conveyor chains 142,144 relative to the other as illustrated in FIGS. 16 and 17 to adjust the orientation of a plate 186 supported on the conveyor chains. For example, when the shaft 182 of the servo or stepper motor 170 corresponding to the first conveyor chain 142 is rotated clockwise as illustrated in FIGS. 13 and 14, the levers 158,160 are shifted to the right to slightly advance the first conveyor chain 142 relative to the second conveyor chain 144 as illustrated in FIG. 17. Conversely, when the shaft 182 is rotated counterclockwise as illustrated in FIGS. 13 and 14, the levers 158,160 are shifted to the left to slightly retard the first conveyor chain 142 relative to the second conveyor chain 144 as illustrated in FIG. 16.

The servo or stepper motors 170,172 may be operated individually or in unison and may be coupled with a PLC or other controller to automatically adjust the relative positioning of the conveyor chains 142,144 in response to a sensor that senses the orientation of the battery plates on the conveyor chains.

PLATE ENCAPSULATING STATION

The plate encapsulating station 26 receives the battery plates from the plate alignment station 24 and applies insulation to the plates before discharging them to another conveyor 188. As best illustrated in FIGS. 13 and 18–20, the plate encapsulating station includes a pair of feed rollers 190 driven by a feed roller drive line 192, a cutoff roller 194 and an anvil roller 196 driven by a second drive line 198, and a pair of nip rollers 200 that are also driven by the second drive line. The feed rollers feed a web of insulation material 202 from a roll station (not shown) to the cutoff roller and the nip rollers for application to the battery plates as they pass between the nip rollers.

Figure 20:
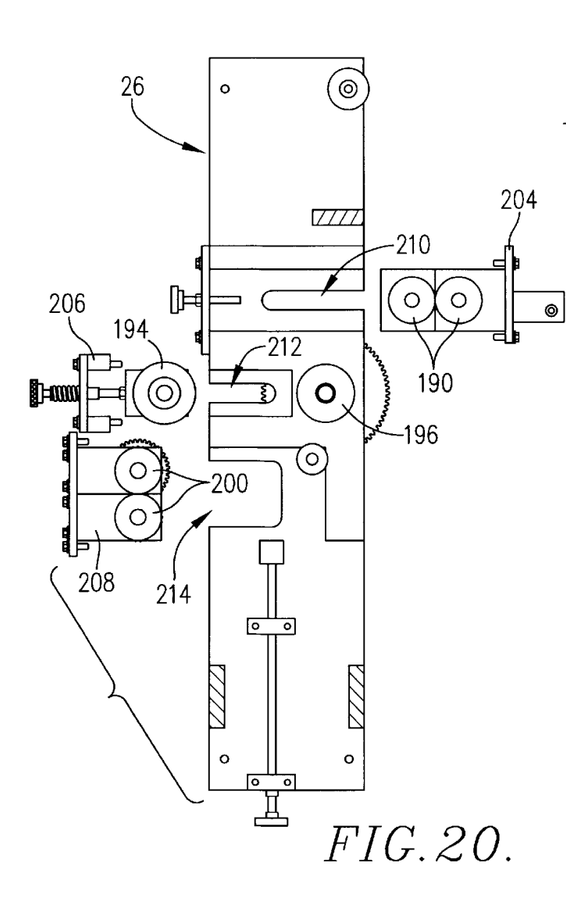
FIG. 20 is a side view of the opposite side of the plate encapsulation station showing several of the components in their removed position.

As best illustrated in FIG. 20, the feed rollers, cutoff roller and nip rollers are mounted to separate frames 204,206,208 that can be selectively inserted or removed from tracks 210,212,214 formed in the housing of the encapsulating station. This allows all of the rollers to be easily removed and replaced during changeover of the plate encapsulating station.

Once the plates have been wrapped, the conveyor 188 carries the plates to a single chain conveyor 190 as illustrated in FIG. 1. As a wrapped plate 216 is deposited on the conveyor 190, the second lug brush cleaning station 20 delivers an unwrapped plate 218 to a perch 220 that is mounted slightly above the conveyor 190 as best illustrated in FIG. 21. The perch has a slot along the length thereof that is parallel to the travel of the conveyor 190. As the chain on the conveyor carries the wrapped plate 216 under the perch 220, a lug 222 on the chain contacts and removes the unwrapped plate 218 from the perch so that it is stacked on top of the wrapped plate. The conveyor then carries the wrapped and unwrapped plates to the plate rejection station 28.

PLATE REJECTION STATION

The plate rejection station 28 receives the wrapped and unwrapped plates from the single chain conveyor 190 and delivers them to a final conveyor 224 that transports the plates to a stacking assembly (not shown). The plate rejection station is operable for rapidly rejecting damaged or otherwise defective plates before they reach the final conveyor.

Figures 22, 23:
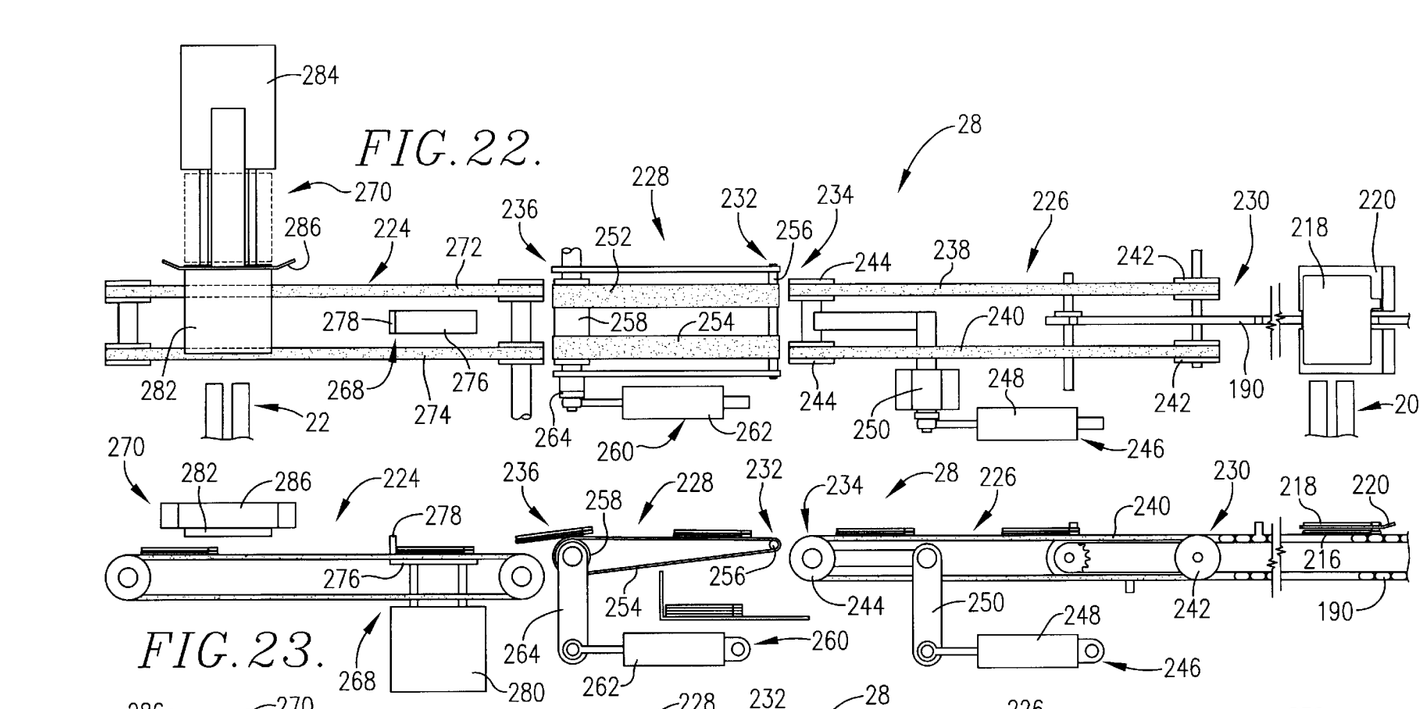
FIG. 22 is a plan view of the plate rejection station and plate synchronization station of the apparatus.
FIG. 23 is an elevational view of the plate rejection and plate synchronization stations showing the plate rejection station in its normal operating position and showing the plate synchronization station in its delay mode.
Figure 24:
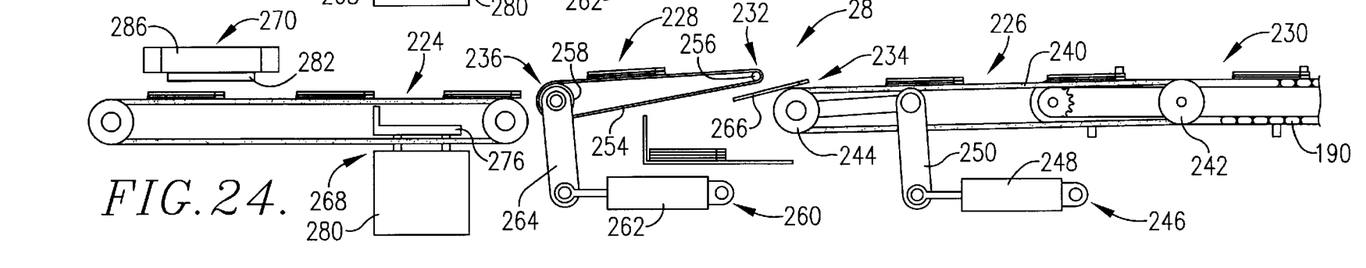
FIG. 24 is an elevational view of the plate rejection and plate synchronization stations showing the plate rejection station in its rejection position and showing the plate synchronization station in its normal mode.

As best illustrated in FIGS. 22–24, the plate rejection station 28 includes a pair of horizontally aligned first and second conveyors 226,228 each having a receiving end 230,232 and a discharge end 234,236. The first conveyor 226 includes a pair of belts 238,240 that are trained over a pair of idler rollers 242 and a pair of drive rollers 244, and a positioning mechanism 246 for selectively lowering the discharge end 234 of the first conveyor. The positioning mechanism includes a cylinder 248 and a pivotal crank 250 that is attached between the cylinder and the drive rollers 244. The cylinder can be selectively extended to raise the discharge end 234 of the first conveyor to an operating position (FIG. 23) or retracted to lower the discharge end to a rejection position (FIG. 24).

Similarly, the second conveyor 228 includes a pair of belts 252,254 that are trained over an idler roller 256 and a drive roller 258, and a positioning mechanism 260 for selectively raising the receiving end 232 of the second conveyor. The positioning mechanism includes a cylinder 262 and a pivotal crank 264 that is attached between the cylinder and the drive roller 258. The cylinder can be selectively extended to lower the receiving end 232 of the second conveyor to an operating position (FIG. 23) or retracted to raise the receiving end to a rejection position (FIG. 24).

During normal operating conditions, the first and second conveyors 226,228 are shifted to their operating positions illustrated in FIG. 23 so that plates may pass from the first conveyor to the second. However, when a defective plate 266 is detected, the first and second conveyors are shifted to their rejection positions illustrated in FIG. 24 so that the defective plate drops from the first conveyor before it reaches the second conveyor. The cylinders 248,262 are preferably cross-coupled so that as the cylinder 248 lowers the discharge end 234 of the first conveyor 226, the cylinder 262 raises the receiving end 232 of the second conveyor 228. This allows both of the conveyors to be simultaneously raised or lowered only a short distance to significantly increase the reaction time of the plate rejection station 28.

The cylinders 248,262 may be manually controlled or may be coupled with a PLC or other controller to automatically reject plates in response to a sensor that senses defective or damaged plates.

PLATE SYNCHRONIZATION ASSEMBLY

The final conveyor 224 receives the plates that have not been rejected by the rejection station 28 and transports the plates to a stacking assembly (not shown). The synchronization assembly 30 is provided for temporarily suspending the transport of the plates on the conveyor 224 so that the stacking assembly and other stations downstream of the apparatus 10 can be operated. Then, when the plates are ready to be once again transported downstream, the synchronization assembly accurately places the plates in proper order so that the transport of the plates through the apparatus 10 is synchronized with the operations that occur downstream of the apparatus.

As best illustrated in FIGS. 22–24, the synchronization assembly 30 includes a mini-stack assembly 268 and a perch assembly 270. The mini-stack assembly is positioned between the conveyor belts 272,274 of the final conveyor 224 and includes a support tray 276 having an upstanding backwall 278 that serves as a stop and a cylinder 280 for selectively raising and lowering the tray. When the tray is lowered as illustrated in FIG. 24, the final conveyor transports the battery plates toward the stacking assembly without interruption. However, when the tray is raised as illustrated in FIG. 23, the tray temporarily suspends the forward travel of the battery plates. The mini-stack assembly 268 may be manually operated or may be coupled with a PLC or other controller so that it is automatically operated in sequence with the stacking assembly.

The perch assembly 270 is operably coupled with the lug brush cleaning mechanism 22 of the manual plate feeder station 16 and includes a horizontally disposed platform 282, a cylinder 284 for selectively extending and retracting the platform, and a fixed backstop 286 as best illustrated in FIGS. 22–25. When the tray is extended as illustrated by the solid lines in FIGS. 22 and 25, it catches a plate delivered by the manual plate feeder assembly. When the tray is retracted as illustrated by the dashed lines, it slides underneath the backstop so that the battery plate supported thereon is dropped onto the conveyor 224. The perch is operated in sequence with the mini-stack assembly so that it drops its battery plate at a precise location relative to the plates that are carried on the conveyor and released by the mini-stack. As mentioned above, the manual plate feeder station is only used for the manufacture of batteries requiring an extra wrapped or unwrapped plate.

Although the invention has been described with reference to the preferred embodiment illustrated in the attached drawing figures, it is noted that equivalents may be employed and substitutions made herein without departing from the scope of the invention as recited in the claims.

Having thus described the preferred embodiment of the invention, what is claimed as new and desired to be protected by Letters Patent includes the following:

1. A plate handling apparatus comprising:
   a conveyor mechanism for advancing a battery plate having a lug;
   a lug brush cleaning mechanism positioned adjacent the conveyor mechanism for cleaning the lug on the battery plate as the battery plate passes thereby;
   the lug brush cleaning mechanism including
       a pair of rotatable lug brushes, and
       positioning mechanism for simultaneously positioning the brushes relative to the conveyor mechanism to permit simultaneous adjustment of the brushes as they become worn, the positioning mechanism including
           a first tie rod coupled with the first brush,
           a second tie rod coupled with the second brush,
           a motor assembly for moving the first tie rod in one direction and simultaneously moving the second tie rod in an opposite direction, and
           a pancake cylinder coupled with each of the first and second tie rods for fine tuning the position of the brushes.

2. The plate handling apparatus as set forth in claim 1, wherein the motor assembly moves the first and second tie rods equal distances.

3. The lug brush cleaning mechanism as set forth in claim 1, further including a cylinder for raising both the first and second lug brushes.

4. A plate handling apparatus comprising:
   a conveyor assembly for advancing a battery plate having a lug;
   a lug brush cleaning mechanism positioned adjacent the conveyor mechanism for cleaning the lug on the battery plate as the battery plate passes thereby, the lug brush cleaning mechanism including
       a pair of rotatable lug brushes, and
       positioning mechanism for simultaneously positioning the brushes relative to the conveyor mechanism to permit simultaneous adjustment of the brushes as they become worn, the positioning mechanism including
           a rotatably mounted servo arm,
           a first tie rod having a lower end coupled with the first brush and an upper end connected to the servo arm,
           a second tie rod having a lower end coupled with the second brush and an upper end connected to the servo arm, a motor assembly for selectively rotating the servo arm for moving the first tie rod in one direction and simultaneously moving the second tie rod in an opposite direction to simultaneously move both the first and second brushes either toward one another or away from one another.

5. The plate handling apparatus as set forth in claim 4, the positioning mechanism further including a pancake cylinder coupled with each of the first and second tie rods.

6. The plate handling apparatus as set forth in claim 4, the conveyor assembly including a pair of stacked conveyor belts and a biasing mechanism for biasing the conveyor belts into contact with one another.

7. The plate handling apparatus as set forth in claim 6, the biasing mechanism including a fixedly mounted roller operatively coupled with the lower conveyor and a spring-biased roller operatively coupled with the upper conveyor for exerting a downward force on the upper conveyor.

8. A plate handling apparatus comprising:

a conveyor mechanism for advancing a battery plate having a lug;

a lug brush cleaning mechanism positioned adjacent the conveyor mechanism for cleaning the lug on the battery plate as the battery plate passes thereby, the lug brush cleaning mechanism including a pair of rotatable lug brushes, and positioning mechanism for simultaneously positioning the brushes relative to the conveyor mechanism to permit simultaneous adjustment of the brushes as they become worn; and a powered cylinder for simultaneously raising both lug brushes in the same direction to a service position wherein both lug brushes are raised above and out of the conveying path of the battery plates.

* * * * *